UNITED STATES PATENT OFFICE.

CARLETON ELLIS, OF MONTCLAIR, NEW JERSEY, ASSIGNOR TO ELLIS-FOSTER COMPANY, A CORPORATION OF NEW JERSEY.

PROCESS OF MAKING SULFURIC ANHYDRID AND CATALYZER THEREFOR.

1,204,141.  Specification of Letters Patent.  Patented Nov. 7, 1916.

No Drawing.  Application filed January 29, 1916. Serial No. 75,028.

*To all whom it may concern:*

Be it known that I, CARLETON ELLIS, a citizen of the United States, and a resident of Montclair, in the county of Essex and State of New Jersey, have invented certain new and useful Improvements in Processes of Making Sulfuric Anhydrid and Catalyzer Therefor, of which the following is a specification.

This invention relates to catalytic material specifically adapted for making sulfuric acid by the contact method and relates in particular to contact material containing chromium oxid material in a particularly reactive form, preferably in a flaky or feathery and absorptive form, incorporated with other bodies capable of combining with sulfur dioxid and capable of increasing the catalytic conversion of sulfur dioxid and oxygen into sulfur trioxid.

Chromium oxid when using alone as a contact material and which has been prepared in any manner which produces a dense product shows but slightly greater activity than iron oxid in the conversion of sulfur dioxid to sulfur trioxid. When it is obtained in a very light feathery or flaky form, such for example as is secured by igniting ammonium bichromate, the product is considerably more active but has the disadvantage of powdering when exposed as a catalyzer under the heating conditions required, so that a porous feathery mass initially permeable to gases after a time may become a more compact powder and in many cases the finer particles float away as a dust in the gaseous current, causing trouble at some later stage of the operation.

It is the object of the present invention to utilize the activity of material such as chromium oxid in a light feathery or greatly expanded condition while at the same time securing sufficient strength or weight as the case may be so that the product will continue to maintain the requisite porosity and not show the same tendency to become suspended or float away in the gaseous current passing through or into contact with it.

In order to prepare a catalytic structure of this character I may incorporate with extended oxid of chromium material a certain amount of an oxid or other suitable compound of an easily fusible heavy metal including the compounds of tin and antimony, lead, bismuth and cadmium. It is not necessary to incorporate these compounds in the proportion of their combining weights as a greater or lesser amount suffices and in particular a lesser amount of the tin oxid or the like than the combining weight is generally preferable. Some oxids of these heavy metals in particular those of lead and antimony have the property of absorbing sulfur dioxid. Lead oxid for example, will absorb approximately one hundred times its volume of sulfur dioxid. This property is also possessed to a lesser degree by the oxids of the other metals above mentioned. This absorbing facility of these oxids tends to enhance the catalytic activity of the chromium oxid by bringing into the zone of the catalytic reaction a larger quantity of sulfur dioxid in a given space than otherwise would be obtained. It is conceivable that these oxids function to concentrate the sulfur dioxid to such an extent as to give the effect of operation under high pressure. Quantities of the heavy metal compounds amounting to from five to fifty per cent. of their combining weight are preferably incorporated with the chromium material and may be in part combined chemically with it. These contact bodies are not readily poisoned by arsenic and other substances which effect catalyzers of the platinum group of metals. While material such as charcoal or inert refractory bodies in a fine or coarse condition may be used as a supporting agent or carrier, it is not often necessary to use such bodies as the extended physical form in which my contact material may be obtained enables it to be used *per se* to better advantage than if the supporting material were present to unnecessarily occupy useful space which in the present case can be filled by the true catalytic material itself.

The contact material may be made up in the form of fine particles, feathery masses or as porous granules of fibrous feathery or attenuated particles which affords a structure of quite a permanent nature, not having the same tendency to become converted into too fine a powder characteristic of the chromium oxid prepared from ammonium bichromate, as the heavy metal compound besides weighting the chromium oxid, exerts a stiffening or hardening action on the feathery mass affording a bonded structure as indicated.

A suitable method of preparation is to mix the salt of a heavy metal (such for example as the chlorid) with ammonium bichromate and ignite this mixture. Oftentimes a fairly violent reaction takes place during the ignition and the ammonia present apparently is oxidized by the oxygen of the chromate forming chromium oxid intimately associated with the fusible metal oxid or similar compound while more or less ammonium chlorid is driven off by the heat.

The best conditions for carrying out the process of making sulfuric acid employing the contact material described herein comprehend the use of dry air and dry sulfur dioxid and in consequence the gaseous mixture or components may be suitably exposed at any convenient prior stage to the action of a drying agent such as sulfuric acid. A trace of moisture is however usually necessary to enable the reaction to take place. Larger quantities of moisture have been found to give trouble in apparatus made of iron by forming basic iron sulfate or something of that character which clogs the apparatus.

The temperature is capable of very wide variation but between 700 and 900° F., good results are obtained. A closer desirable range is 800–900° F. The pressure is ordinarily atmospheric pressure, or thereabout, although higher or lower pressures may be used if desired.

An illustrative example is herein given involving antimony in combination with or admixed with the chromium material. Fifty parts of chlorid of antimony are incorporated with eighty-five parts of ammonium bichromate using a sufficient amount of water for this purpose. The product is heated and after the water has been largely expelled a rather violent reaction takes place accompanied by flashes of light wherein a dark colored spongy product is obtained containing antimony and chromium material. This product is further heated until fumes of ammonium chlorid no longer are given off. A light feathery or extended voluminous porous mass is obtained which can be broken up into small granules or porous fragments made up of this feathery or flaky chromium material of a basic character knit or bonded together by the stiffening and weighting compound of antimony or equivalent material and such granules constitute the finished catalyzer in its preferred form. On exposure of this material to a single current of constant volume of a mixture of sulfur dioxid and air at a temperature between 800–900° F., the following results were obtained.

| Sulfur dioxid in initial mixture. | Sulfur dioxid in exit gases. | Efficiency. |
|---|---|---|
| 6.10% | 0.45% | 93.2% |
| 4.77% | 0.33% | 93.4% |
| 3.91% | 0.22% | 94.6% |
| 4.95% | 0.34% | 93.5% |
| 7.67% | 0.69% | 93.8% |

It should be noted that the degree of conversion within the limits indicated is practically independent of the percentage of sulfur dioxid entering gaseous mixture provided of course, that an approximately equivalent amount of free oxygen is present.

The residual gases from the operation after absorption of the sulfuric anhydrid may be again passed over this or other suitable catalytic material to carry the conversion further. The sulfur trioxid produced is suitably absorbed to yield oleum or other form of sulfuric acid.

The degree of conversion of sulfur dioxid with the contact material of the present invention is usually between 80–95% after the material has been duly worked up to operating conditions and has settled down to a substantially permanent condition of activity.

The oxids of the easily fusible metals specified have this coöperative effect in greater or lesser degree on chromium material and also have the very important property of protracting the life of the contact material over a very considerable period of time. Under actual operating conditions it is likely that more or less transient or permanent combination with sulfur dioxid and trioxid occurs or some similar change as a part of the mechanics or chemical conditions underlying this catalytic action.

I do not claim herein, the catalyst in a granular, porous form, having a sufficient strength to prevent crushing, since this feature constitutes the invention claimed in an application filed jointly by myself and H. M. Weber, Serial No. 67,357.

I do not specifically herein claim the production of sulfuric anhydrid by means of catalysts containing tin oxid and chromium oxid, the same being claimed in my copending applications, Serial Numbers 103,566 and 65,285.

What I claim is:—

1. A catalyzer adapted for making sulfur trioxid from sulfur dioxid and air comprising active chromium material of a basic character weighted by an oxy-compound of an easily fusible heavy metal capable of absorbing sulfur dioxid.

2. A catalyzer adapted for making sulfur trioxid from sulfur dioxid and air comprising active chromium material weighted and stiffened by a compatible compound of an easily fusible heavy metal.

3. A catalyzer adapted for making sulfur trioxid from sulfur dioxid and air comprising voluminous chromium oxid and a compatible compound of an easily fusible heavy metal capable of absorbing sulfur dioxid.

4. A contact material comprising active voluminous chromium oxid material bonded by a compatible binding agent into a substantially permanent form, capable of yielding 80 to 95% conversion of sulfur dioxid to the trioxid.

5. A contact material comprising voluminous chromium oxid uncombined with, but bonded by an oxy-compound of a heavy metal.

6. A contact material comprising voluminous chromium oxid, bonded by an agent capable of increasing its catalytic properties.

7. A contact material comprising voluminous chromium oxid bonded by an oxid of antimony.

8. The process of making sulfur trioxid which comprises bringing a gaseous mixture containing sulfur dioxid and oxygen into contact with granules comprising a flaky oxid of chromium weighted and stiffened by a basic compound of an easily fusible compatible heavy metal.

9. The process of making sulfur trioxid which comprises bringing a gaseous mixture containing sulfur dioxid and oxygen into contact with feathery oxid of chromium incorporated with an oxid of an easily fusible compatible heavy metal.

10. The process of making sulfur trioxid which comprises bringing a gaseous mixture containing sulfur dioxid and oxygen into contact with a flaky oxid of chromium weighted and stiffened by a compound of antimony capable of absorbing sulfur dioxid.

11. The process of making sulfur trioxid which comprises bringing a gaseous mixture containing sulfur dioxid and oxygen into contact with a voluminous oxid of chromium weighted with a compound of antimony capable of increasing the catalytic activity of said chromium oxid.

12. A process of making sulfur trioxid which comprises bringing a gaseous mixture containing sulfur dioxid and oxygen into contact with a chromium-oxid-containing material in association with a substance capable of stiffening and strengthening the same.

13. A process of making sulfur trioxid which comprises bringing a gaseous mixture containing sulfur dioxid and oxygen into contact with a chromium-oxid-containing material in association with a substance capable of stiffening and strengthening the same, said substance also being capable of increasing the catalytic activity of the said chromium-oxid-containing material.

14. A process of making sulfur trioxid which comprises bringing a gaseous mixture containing sulfur dioxid and oxygen into contact with a chromium-oxid-containing material in association with a solid substance capable of absorbing sulfur dioxid.

15. A process of making sulfur trioxid which comprises bringing a gaseous mixture containing sulfur dioxid and oxygen into contact with a chromium-oxid-containing material in association with a metal oxy-compound capable of absorbing sulfur dioxid.

16. A process of making sulfur trioxid which comprises bringing a gaseous mixture containing sulfur dioxid and oxygen into contact with a chromium-oxid-containing material in association with an oxid capable of increasing the catalytic activity of the said chromium-oxid-containing material.

17. A process of making sulfur trioxid which comprises contacting a gas mixture comprising sulfur dioxid and free oxygen with a catalyst comprising an oxid of chromium and a metal oxid capable of absorbing $SO_2$.

CARLETON ELLIS.